Aug. 7, 1945.  E. F. CHANDLER  2,381,110
LOCK NUT
Filed July 11, 1942
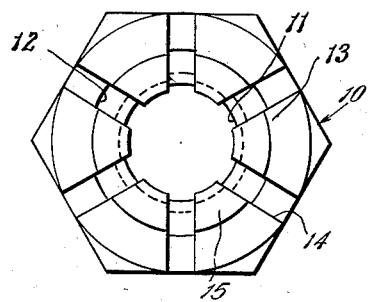
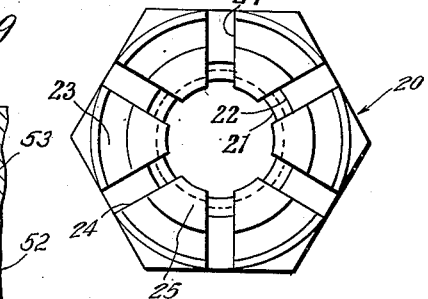
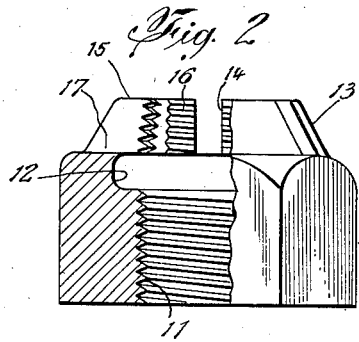
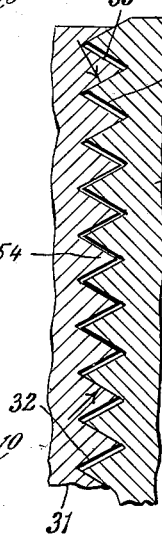
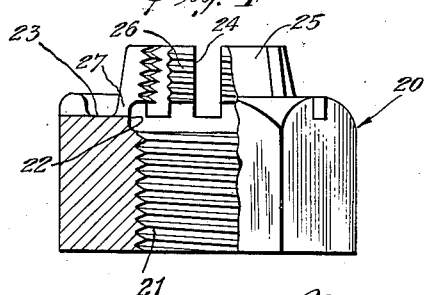
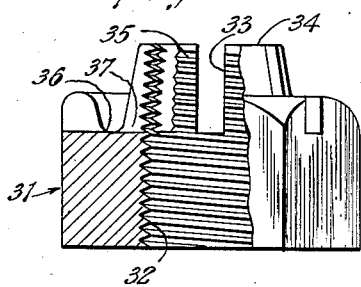
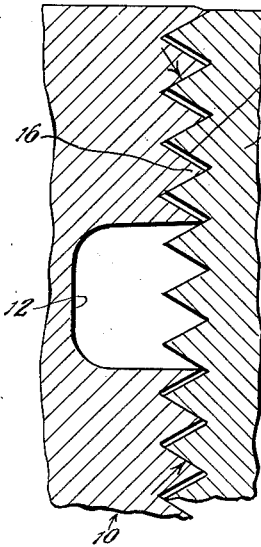
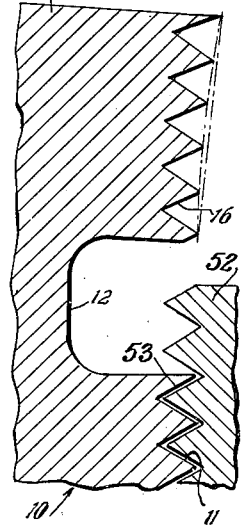
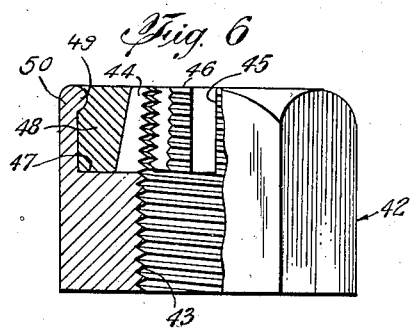
INVENTOR
Edward F. Chandler
BY John P. Chandler
his attorney Patented Aug. 7, 1945

2,381,110

UNITED STATES PATENT OFFICE 2,381,110

LOCK NUT

Edward F. Chandler, Brooklyn, N. Y.

Application July 11, 1942, Serial No. 450,505

3 Claims. (Cl. 151—21)

This invention relates to new and useful improvements in lock nuts, and has for its principal object the provision of a novel nut formed of one piece of metal or other material, and being so constructed that neither vibration, continued wear, excessively hard service nor shock can cause the nut to turn. These results are obtained whether the nut is firmly seated against a supporting surface or whether it contacts nothing but the bolt or threaded rod upon which it is carried.

Another object of the present invention is the provision of a nut of the character described wherein axial play between the nut and bolt is completely eliminated, and also wherein the nut may be rotated to its desired position on the bolt with a minimum of effort, particularly as compared with the general run of lock nuts having distorted thread sections.

The lock nut art has been well developed. One type of nut which is used extensively is formed with a recess at one end which receives and firmly supports a collar of compressed fibrous material having an unthreaded aperture therein aligned with, and being of substantially the same size as, the threaded bore in the nut. Despite generally satisfactory results, this type of nut is open to the objection that the fiber element is attacked by certain acids oftentimes present in water, and by certain climatic conditions. More important still, the nut becomes progressively more loose on the bolt as it may from time to time be removed and again replaced. This is partly due to the fact that the fiber takes a set after a number of thread-cutting operations.

If a nut and bolt assembly is provided with a close fit, the chance of the nut loosening from vibration or other causes is materially reduced. In commercial use, however, a very close fit is not practical since an easy starting assembly is necessary. It is also known that if friction between two elements is to be increased, the two elements should be formed of the same materials, and the use of fiber and metal does not answer this purpose.

The lock nut of the present invention is made preferably, though not necessarily, of the same material as the bolt. The entire nut is made of one piece of material, and its main body portion may be of the same size and shape as any standard nut. At one end the nut is provided with an integrally formed, castellated extension having a threaded bore therein which is a continuation of the threaded bore in the main body of the nut. The castellated extension forms, in effect, a plurality of spaced, segmental jaws provided with internal thread segments. These jaws are tipped inwardly, forming a slightly restricted upper throat portion of the nut. Also, the jaws are weakened at or near their bases or points of connection with the main body of the nut, and when they are tipped inwardly, as aforesaid, they exert a yielding pressure-grip on the threads of the bolt.

The weakened area between the jaws and their support, viz, the main body of the nut, may be obtained either by forming an internal or an external annular recess, or both. The external recess has the advantage that a continuous, uninterrupted thread is formed in the bore. The internal recess has certain advantages which will be pointed out hereinafter.

The restricted throat in the castellated upper end of the nut may be formed in a variety of ways. First, the nut may be drilled from end to end and the resulting bore, which is of uniform diameter, may then be tapped in the usual way. The spaced jaws forming the castellated upper end of the nut are then tipped inwardly a few thousandths of an inch by unsetting with a suitably formed die having a tapered recess. Second, a tapered bore may be formed, the bore being of uniform diameter through the main body portion and being inwardly tapered from thence on upwards. The bore may then be threaded with the usual tap, starting, however, at the lower end. As the tap enters the castellated portion, the jaws retract outwardly a slight amount, and when the tap is removed the jaws resume their original position. Thirdly, a straight bore may be formed, and the bore then threaded with a tapered tap.

Another object of the present invention is the provision of an improved frictional or self-locking system applicable to nuts and bolts, and other fastening assemblies, wherein one of the elements has means for providing a plurality of oppositely disposed, load-carrying surfaces.

A further object of the invention is to provide a pair of elements such as a bolt and nut, in which commercial clearance is provided for easy initial assembly, and wherein, when the nut element has been rotated to its final position on the bolt or other element, said clearance is substantially reduced. In other words, when the main body portion of the nut has been received upon the bolt, the jaw sections of the nut come into play and thus reduce the axial movement of the nut relative to the bolt to a pre-determined minimum.

Another important feature of the invention resides in the fact that the thread in the jaw sections is a true thread and is, strictly speaking, a continuation of the thread in the main body portion, thus distinguishing the invention from the devices of the art wherein the various auxiliary locking and clamping means do not constitute a true thread, and in many instances no thread at all.

A further object of the invention is the provision of a lock nut wherein the threads in the castellated section are not distorted but are merely moved inwardly, and accordingly the nut, although exerting a powerful grip on the thread of the bolt, nevertheless may be applied to the bolt with fair ease.

Yet another object of the present invention is the provision of a novel locking system associated with the nut wherein the threads adjacent to opposite ends of both the main body portion of the nut and the yieldable jaw sections thereof exert a relatively constant, oppositely disposed pressure on the load-carrying sides of the threads in the bolt. In other words, the upper surfaces of the threads at the lower end of the nut, and the lower surfaces of the threads at the upper end of the nut, constitute the frictionally-engaged locking means.

In a modified form of the present invention, a resilient collar is employed for the purpose of resisting outward movement of the jaw portions, which resilient collar does not, however, contact the bolt threads.

In the drawing:

Fig. 1 is a top plan view of one embodiment of the present invention.

Fig. 2 is a side elevation thereof, partially in section.

Fig. 3 is a top plan view of a nut constituting the second form of the present invention.

Fig. 4 is a side elevation thereof, partially in section.

Fig. 5 is a side elevation, partially in section, of a nut constituting another embodiment of the present invention.

Fig. 6 is a side elevation, partially in section, of yet another embodiment of the present invention.

Fig. 7 is an enlarged schematic section of a nut-and-bolt assembly showing the application of pressures of the load-carrying surfaces of the nut thread to the load-carrying bolt thread surfaces.

Fig. 8 is similar to Fig. 7, but shows only the main thread section of the nut element received on the bolt.

Fig. 9 is another schematic section of a nut-and-bolt assembly showing the application of pressures to load-carrying surfaces present in the nut shown in Figs. 5 and 6.

The figures in the drawing are largely schematic in character and are in no sense working drawings.

One embodiment of the invention is illustrated in Figs. 1 and 2, wherein the nut is designated generally by the reference character 10. The nut may be hexagonal in shape and is formed with a threaded bore 11 in its main body portion which, in this instance, is at the lower end of the nut. Adjacent to the upper end of the main body portion is formed an internal annular recess 12. The upper extension portion of the nut is inwardly tapered, as shown at 13, and such extension portion is castellated, that is to say, a plurality of transverse milled cuts 14 are suitably formed, thus providing a plurality of spaced jaws 15. The upper extension portion is further formed with a threaded bore 16 in axial alignment with bore 11.

Jaws 15 are inwardly tipped, thus providing a restricted threaded collar portion of the nut. By providing the internal annular recess 12, the connecting portions 17 between the jaws and the main body portions of the nut are weakened, and accordingly jaws 15 yieldably engage the threads of the bolt when the nut is rotated to a point wherein the upper end of the bolt engages the threads of the jaw sections.

The nut forming the second embodiment of the present invention is illustrated in Figs. 3 and 4, and is designated generally by the reference numeral 20. The main body portion of the nut is likewise formed with a threaded bore 21 therein which terminates at its upper end in the internal annular recess 22 similar to that shown in Fig. 2. In this instance, however, the upper extension portion is modified in that on the upper surface of the main body portion an external annular recess 23 is formed, the purpose of which is to increase the resiliency of the jaw sections without increasing the height of the nut. A plurality of milled slots 24 form jaws 25 in the upper extension portion, and such portion is likewise formed with the threaded bore 26 in alignment with bore 21. It will be seen that the reduced throat sections 27 are somewhat weaker and afford more resiliency than do those in the nut shown in Fig. 2.

In Fig. 5 the nut 31 has a continuous threaded bore 32 therein which extends upwardly through the upper extension section. This upper extension section also has the milled slots 33 forming jaw sections 34, which also are inwardly tipped to provide an inwardly tapered, threaded section 35 of the bore. On the upper end of the main jaw section, an external annular recess 36 is formed, thus providing a weakened throat section at the point of juncture between the jaw sections and the main body portion of the nut.

It was earlier pointed out that the inwardly tapered or restricted throat portion of the nut may be formed in a variety of ways, although possibly the simplest way of accomplishing this is to form the bore of the nut of equal diameter from end to end, then to tap the bore, and finally to tip the jaws inwardly by means of an appropriate die having a tapered recess which preferably engages the upper marginal edges only of the jaw sections. In other words, a vertical section taken through a jaw section would present a slightly curved rather than a straight line defining the outer terminals of the threads. This arrangement in somewhat exaggerated form is shown by the broken lines in Fig. 8. In this way, the jaw sections are not alone bent at their throats, but rather will there be a progressive inward taper starting at the throats of the jaw sections. Conversely, it will be appreciated that as the nut is received on the bolt and the upper portion of the bolt begins to engage the body sections, there will be a progressive application of pressure, the bolt causing a progressive expansive force on the body sections.

The embodiment of the invention illustrated in Fig. 6 is designated by the reference numeral 42, wherein the main body portion of the nut likewise has a central threaded bore 43 extending from end to end, and jaw sections 44 at the upper end of the nut formed by a plurality of transverse slots 45. Such jaw sections are also tipped inwardly in the manner previously described, thus forming an upper tapered section 46 of the bore. In this instance, the upper wall of the nut is provided with a downwardly extending annular recess 47, within which is received a collar 48 which may be formed of fiber, rubber, plastic, or any other suitable resilient material. An inwardly turned flange 49 at the upper end of outer annular wall 50 retains the collar in place. This arrangement, while employing a non-metallic element, nevertheless is not open to the objections previously noted in respect of the fiber collar which contacts the thread of the bolt.

The principle underlying the operation of the nut-and-bolt assembly of the present invention, when the nut of Fig. 2 is employed, will be clear when reference is had to Figs. 7 and 8. In Fig. 8 the bolt element 52 is formed with the usual threads 53, and when the main body portion of the nut 10 is applied to the bolt, there is the usual commerical clearance between the respective threads, as shown. There is also the usual axial play between the bolt and nut. As rotation of the nut is continued, the threads at the upper end of the bolt eventually contact threads 16 in the jaw portions 15 of the nut, and when this occurs, the bolt is, in effect, urged downwardly, at first only slightly, thus causing the upper surfaces of the threads in the body portion of the nut and the lower surfaces of the bolt threads to become load-carrying surfaces, as shown in Fig. 7. At the same time, the opposite condition exists in the threads in the jaw portions 15, and as rotation of the nut continues, this oppositely disposed, compressing action of the two sections of the nut threads becomes more pronounced.

The direction of these forces as applied by the nut threads is indicated by the arrows in Fig. 7. This action, however, is more compressive than binding, and the nut never becomes "frozen" on the bolt so as to render rotation exceedingly difficult. It is also important to note that jaws 15 apparently never take a "set" wherein substantial gripping action is lost, as in the case of the fiber collars in the lock nuts of the art previously referred to.

Fig. 9 illustrates the same action when nuts of the type shown in Figs. 5 and 6 are employed. In this instance, there is an area 54 lying largely in the throat sections of the jaw portions wherein neither thread surfaces of the nut 31 appear, in this exaggerated view, to constitute load-carrying surfaces. Below this area, however, it will be noted that the upper surfaces of the nut threads exert their forces upwardly in the direction of the arrow, and the opposite is true of the nut threads above this throat area.

If the nut is carefully formed in the manner shown and described, particularly with the slight curvature of the inner terminals of the teeth, as shown in Fig. 8, the best results will be obtained. It will be appreciated, however, that highly superior results for most commercial purposes will be obtained even though the nut is not as carefully formed as has been suggested. In other words, the principal locking action comes from the inward tipping of the jaw sections, and if the thread in the auxiliary thread section is not a true continuation of the thread in the main thread section so as to exert the oppositely disposed, compressive action illustrated in Fig. 7, the nut will nevertheless have a strong gripping action on the bolt which will positively prevent any shaking loose of the nut. In other words, the curvature shown in Fig. 8 is optional, and even if such curvature is not present, the thread segments, when they are moved outwardly due to the action of the bolt, constitute segments of a true circle, which is one of the important features of the present invention. The jaw sections function somewhat like a clutch or a chuck and firmly grasp the bolt regardless of which sides of the threads are load-bearing surfaces.

It will further be appreciated that many changes and modifications may be made in the several embodiments of the nut constituting the present invention without departing from the spirit of such invention.

What I claim is:

1. A self-locking nut having a threaded bore therein forming a lower thread section and an upper thread section, the upper face of the nut having an annular recess therein, the upper section further having a plurality of downwardly-extending slots which are longitudinally disposed relative to the axis of rotation of the nut, thus forming a plurality of spaced, internally-threaded jaw portions which are inwardly tipped and form the upper thread section which is a continuation of said lower thread section, the lower end of the recess and the lower ends of the slots lying on substantially the same plane, such plane defining the lower end of the upper thread section, and a resilient, compressible member secured within the annular recess which resists outward movement of the jaw portions, said jaw portions being progressively moved rearwardly, when the nut is applied to a bolt.

2. A self-locking nut comprising a body portion having a threaded bore therein and having an annular recess in the upper wall thereof, the upper end of the body section being provided with a plurality of slots therein which are longitudinally disposed relative to the axis of rotation of the nut, thus forming a plurality of spaced jaw sections which are inwardly tipped to form a restricted passage for a bolt, a resilient member positioned within the annular recess which resists outward movement of the jaw sections when the nut is applied to the bolt, and means for retaining the resilient member in the recess.

3. A self-locking nut comprising a body portion having a threaded bore therein and having an annular recess extending downwardly from the upper face thereof, the lower end of the recess being narrower in transverse section than the upper end thereof, the upper end of the body section being provided with a plurality of slots therein which are longitudinally disposed relative to the axis of rotation of the nut, thus forming a plurality of spaced jaw sections which are inwardly tipped to provide a clamping action when the nut is applied to a threaded article, and a resilient member shaped to fit the annular recess positioned within such recess and resisting outward movement of the jaw sections when the nut is applied to a bolt.

EDWARD F. CHANDLER.